(12) United States Patent  (10) Patent No.: US 7,631,746 B2
Bilodeau et al.  (45) Date of Patent: Dec. 15, 2009

(54) BOARD POSITIONING SYSTEM AND METHOD, AND FENCE ASSEMBLY

(75) Inventors: Alain Bilodeau, Normandin (CA); Marc Gloutier, Normandin (CA)

(73) Assignee: 9051-8127 Quebec Inc., Normandin, Quebec (CA)

( * ) Notice: Subject to any disclaimer, the term of this patent is extended or adjusted under 35 U.S.C. 154(b) by 230 days.

(21) Appl. No.: 11/974,048

(22) Filed: Oct. 11, 2007

(65) Prior Publication Data

US 2009/0095597 A1 Apr. 16, 2009

(51) Int. Cl.
B65G 47/24 (2006.01)
(52) U.S. Cl. .................. 198/416; 198/456; 198/457.05
(58) Field of Classification Search .................. 198/416, 198/456, 457.05; 144/253.6, 250.2; 83/704, 83/705, 732, 448
See application file for complete search history.

(56) References Cited

U.S. PATENT DOCUMENTS

| | | | |
|---|---|---|---|
| 2,253,453 A | 8/1941 | Van Deinse | |
| 2,918,951 A | 12/1959 | Haumann | |
| 3,033,341 A | 5/1962 | Cromeens | |
| 3,701,219 A * | 10/1972 | Sternal | ........................ 451/300 |
| 3,985,055 A | 10/1976 | Cornell | |
| 4,069,910 A | 1/1978 | Faley et al. | |
| 4,143,755 A | 3/1979 | Keller | |
| 4,164,248 A | 8/1979 | Rysti | |
| 4,284,186 A * | 8/1981 | Brouwer | ..................... 198/415 |
| 4,633,924 A | 1/1987 | Hasenwinkle et al. | |
| 4,753,335 A | 6/1988 | Goater | |
| 5,142,955 A | 9/1992 | Hale | |
| 5,368,080 A | 11/1994 | Hamel | |
| 5,785,102 A | 7/1998 | Hamel | |
| 5,865,080 A | 2/1999 | Jackson | |
| 5,911,302 A | 6/1999 | Jackson | |
| 5,960,104 A | 9/1999 | Conners et al. | |
| 6,173,829 B1 | 1/2001 | Jackson et al. | |
| 6,244,420 B1 | 6/2001 | Pelletier | |
| 6,311,828 B1 | 11/2001 | Newnes et al. | |
| 6,374,714 B1 | 4/2002 | Rousseau | |
| 6,382,067 B1 | 5/2002 | Gagnon | |
| 6,539,830 B1 | 4/2003 | Koskovich | |
| 6,651,798 B2 | 11/2003 | Newnes et al. | |
| 6,705,190 B2 | 3/2004 | Newnes et al. | |
| 6,736,256 B2 | 5/2004 | Jobin | |
| 7,011,006 B2 | 3/2006 | Koskovich | |
| 7,163,038 B2 | 1/2007 | Rhodes et al. | |
| 7,243,778 B2 * | 7/2007 | Christensen | ................. 198/416 |
| 7,419,047 B2 * | 9/2008 | Cesselli et al. | .............. 198/597 |
| 2002/0117377 A1 * | 8/2002 | Newnes et al. | .............. 198/456 |
| 2005/0000780 A1 * | 1/2005 | Christensen | ................. 198/382 |

* cited by examiner

*Primary Examiner*—James R Bidwell
(74) *Attorney, Agent, or Firm*—Michaelson & Associates; Peter L. Michaelson

(57) ABSTRACT

The system and a method are for lengthwise positioning of transversally-oriented elongated articles as they are being longitudinally conveyed, the system and method comprising sliding a laterally extending end of the elongated article against a fence oriented in a converging angle relative to the conveyor, to thereby displace the elongated article lengthwisely. The fence is comprised of a plurality of adjacent gates which can be individually moved out of interference with the elongated article once the elongated article has been lengthwisely displaced to the desired transversal position. The fence can be provided as a fence assembly having the plurality of gates mounted to a common base, and having a plurality of actuators each connected between the base and a respective gate for moving the gate.

25 Claims, 10 Drawing Sheets

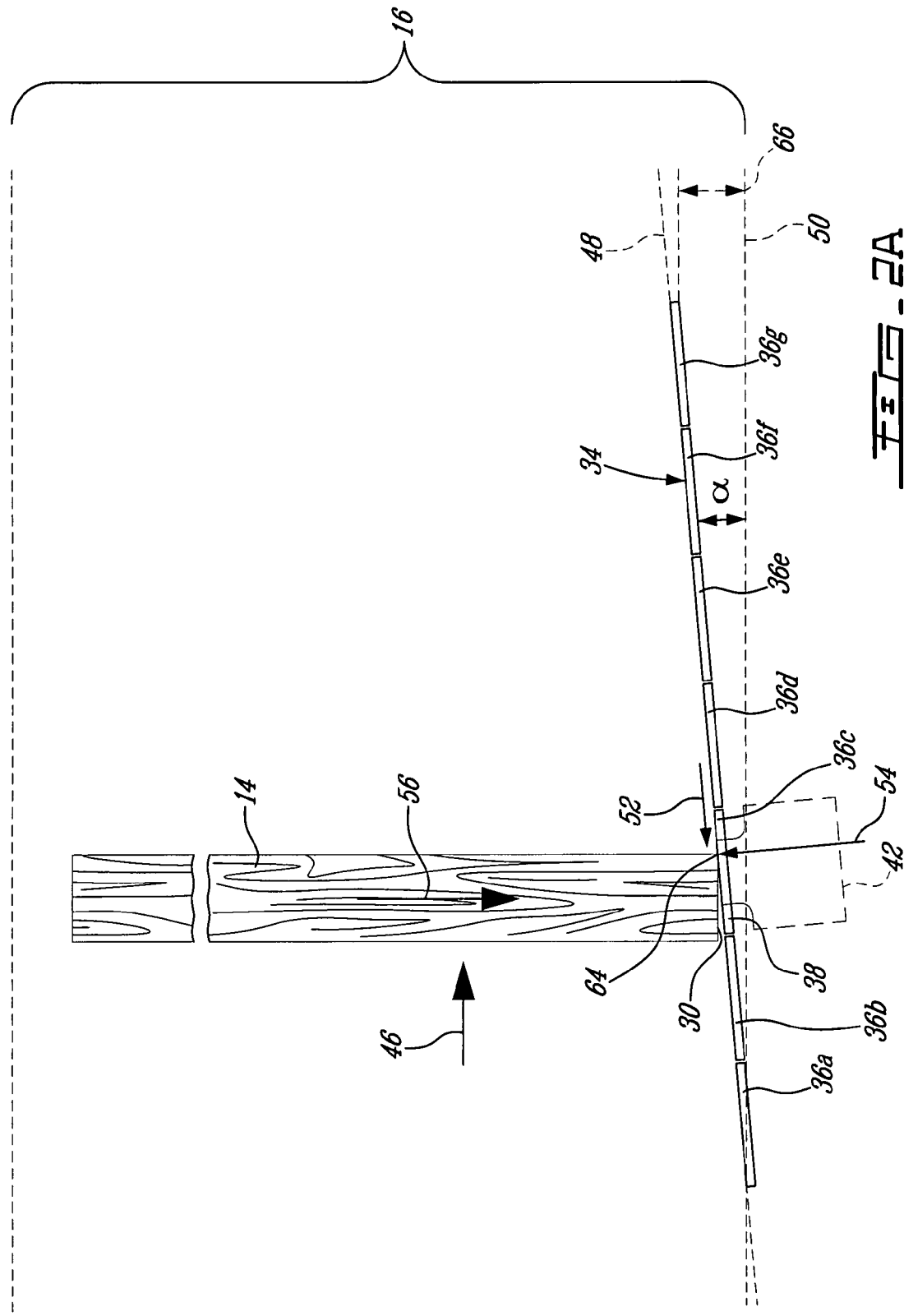

FIG_6

FIG_7

BOARD POSITIONING SYSTEM AND METHOD, AND FENCE ASSEMBLY

FIELD

The specification generally relates to positioning boards lengthwisely as they are being conveyed in a longitudinal direction, the boards being transversally-oriented.

BACKGROUND

The dimensional lumber industry has seen a continuous increase in the automation ratio of production processes in the last decades. Manual interventions are thus progressively eliminated from these processes, in a continuous struggle to lower production costs.

One process which has been the subject of such automation is often referred to in the art as optimization. In this process, parallel and transversally oriented wood boards are scanned as they are longitudinally conveyed on a production line. A system referred to as an optimizer uses the scanning data to identify imperfections in each particular wood board, and calculates a trimming solution to optimize the monetary value of the wood board. For example, a board of a given length could have some imperfections trimmed off one or both ends to yield a board having a higher grade, and therefore having a higher monetary value, although it is not as long as its original length.

The trimming can be done in different ways. One way trimming can be done is by using one or more saws at fixed transversal positions at a given longitudinal location along the conveyance path of the boards. Each board is then displaced lengthwisely (in the transversal orientation), to be positioned in alignment with the particular saw or saws which will trim it in accordance with the trimming solution.

Although known processes and methods to lengthwisely displace such boards have been satisfactory to a certain degree, there remains a need to obtain even more accuracy in positioning the board, and to further increase the longitudinal conveyance speed at which the lengthwise displacement takes place, to further increase production rate.

SUMMARY

In accordance with one aspect, there is provided a system and a method for lengthwise positioning of transversally-oriented elongated articles as they are being longitudinally conveyed, the system and method comprising sliding a laterally extending end of the elongated article against a fence oriented in a converging angle relative to the conveyor, to thereby displace the elongated article lengthwisely. The fence is comprised of a plurality of adjacent gates which can be moved into and out of interference with the elongated article individually, to allow free passage of the elongated article once the desired amount of lengthwise displacement has been reached.

The fence can be provided as a fence assembly having the plurality of gates mounted to a common base and being positioned in the conveyance path of the elongated articles. A plurality of actuators can be connected between the base and the respective gates for moving the gates.

In accordance with another aspect, there is provided a board positioning system, the system comprising: a conveyor having a plurality of longitudinally interspaced pushing elements, each pushing element being configured and adapted to receive a transversally-oriented board, and to exert a longitudinal conveyance force on the received board to convey the board along a conveyance path, with an end of the board extending laterally from the conveyor, when the conveyor is in operation; and a fence, adjacent the conveyor, positioned in the conveyance path, in interference with the laterally-extending end of the board, and defining a converging angle with the conveyor, the fence being configured and adapted to exert a positioning force, reactive of the conveyance force, to move the board lengthwisely as the laterally-extending end of the board is being slidingly conveyed against the fence when the conveyor is in operation, the fence having a plurality of adjacent gates, each gate being individually movable out of the conveyance path, when the positioning force has imparted a given lengthwise displacement to the board, and movable back into a fence position after the board has passed by the respective gate.

In accordance with another aspect, there is provided a method of positioning a transversally-oriented board being conveyed in a longitudinal direction, the method comprising: obtaining a desired transversal position for the board; sliding a laterally extending end of the board against a fence having a plurality of adjacent gates positioned in a common plane, the common plane defining a converging angle relative to the longitudinal direction, the fence thereby imparting a lengthwise displacement to the board; converting the desired transversal position to a longitudinal position of the board relative to the fence; during the sliding, determining when the board reaches the longitudinal position; upon said determining, moving the one of the gates which is in contact with the board out from longitudinal interference with the board; after said moving the one of the gates, moving any subsequent gate or gates of the fence out from interference with the board; and replacing the one of the gates, and the any subsequent gate or gates back into the common plane once the board has passed by each respective gate.

In accordance with another aspect, there is provided a fence assembly for use in a longitudinal elongated article conveyance path of a lug conveyor, to individually displace transversally-oriented and longitudinally-interspaced elongated articles lengthwisely as the elongated articles are being carried by the lug conveyor, the fence assembly comprising: a support body; a plurality of adjacent gates, each gate being movable between a respective fence position and a respective recessed position, the fence positions being immediately adjacent in a common fence plane, and fixedly positioned relative to the support body; a plurality of actuators, each actuator connected between the support body and a respective one of the adjacent gates to actuate the movement of the respective gate; the fence assembly being fixedly positionable relative to the lug conveyor with the fence positions in the elongated article conveyance path, the recessed positions out of the elongated article conveyance path, and the fence plane defining a converging angle relative to the lug conveyor.

DESCRIPTION OF THE FIGURES

FIGS. 2A, 2B and 2C are schematic diagrams showing: forces acting on a board during lengthwise displacement; movement components; and force components, respectively;

DETAILED DESCRIPTION

Figure 1:
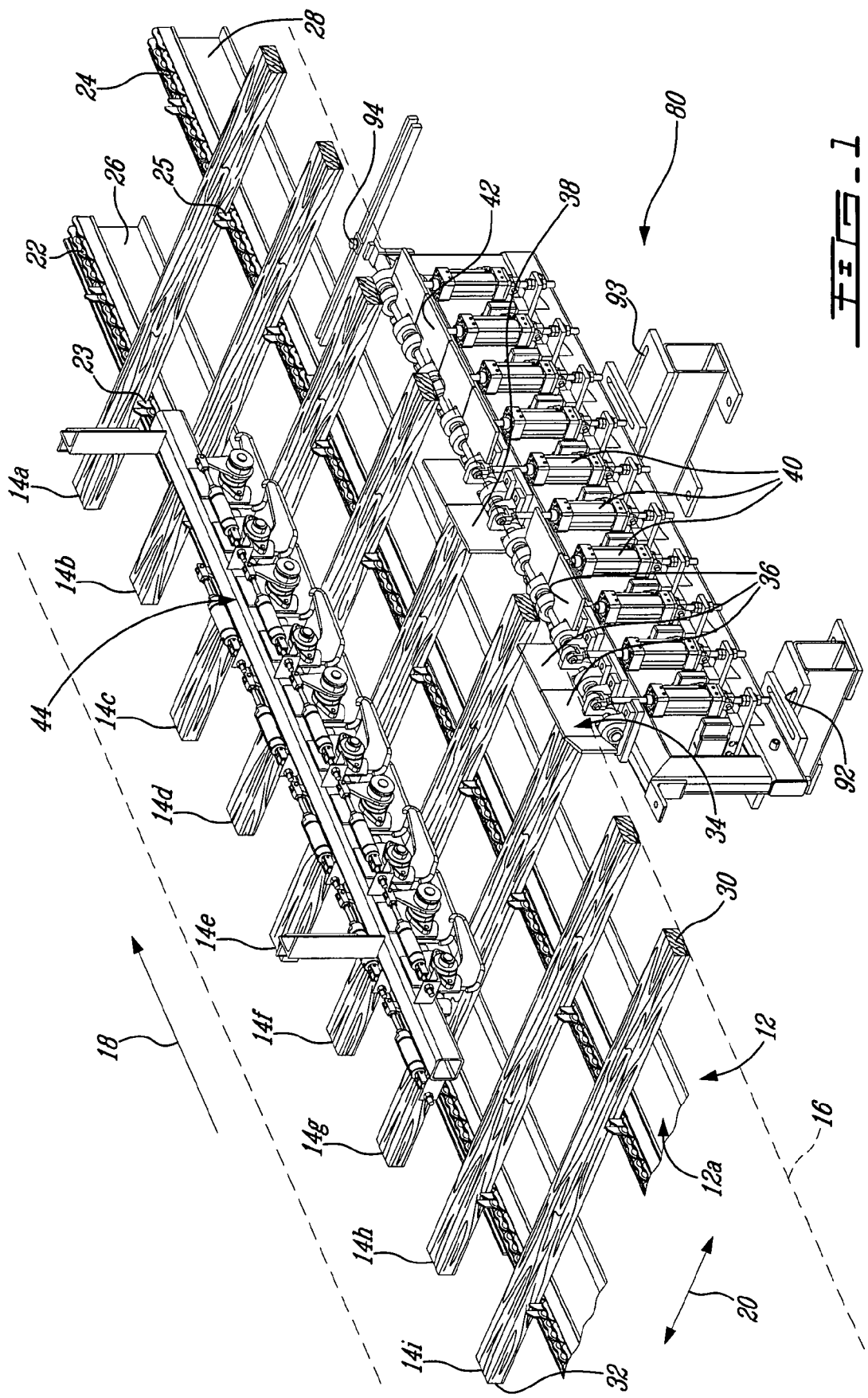
FIG. 1 is a perspective view of an example of a board positioning system.

FIG. 1 shows an example of a board positioning system 10. The system 10 includes a conveyor 12 which conveys interspaced boards 14a, 14b, 14c . . . 14i, along a conveyance path 16. For ease of reference, a longitudinal direction 18 will be defined as the direction of the conveyor 12. Hence, the boards 14a to 14i are longitudinally interspaced and are oriented transversally 20. In this example, the conveyor 12 is a lug chain conveyor 12a having two lug chains 22, 24 each carried on a respective guide rail 26, 28. Longitudinally interspaced pairs of lugs 23, 25 are provided on the lug chains 22, 24 to push the boards 14a to 14i, with each lug 23, 25 of each lug pair being associated with a respective lug chain 22, 24. Each board 14a to 14i has at least one end 30 which extends laterally from the conveyor 12, and an opposite end 32.

The system 10 also includes a fence 34 comprised of a plurality of gates 36 which are normally positioned in respective fence positions 38 along a common fence plane. The fence 34 is positioned in the conveyance path 16, at a converging angle relative to the conveyor 12, and in interference with the laterally-extending end 30 of the boards 14a to 14i such that when a board comes into sliding contact with the fence 34, it is pushed by the fence and displaced lengthwisely to a different transversal position. This will be detailed further below. A main focus in the dimensional lumber production industry is to increase production rate, and therefore, the longitudinal speed at which the boards 14a to 14i are carried by the conveyor 12 in this example can be quite high.

A plurality of actuators 40 are provided, each actuator 40 being associated with a respective gate 36, to move the gate out from the fence position 38, into a recessed position 42, in which it is no longer in interference with the laterally-extending end of the board 14d, to thereby allow the board 14d to maintain its transversal position once a desired amount of transversal displacement has been imparted to the board 14d using previous gates.

In this example, the system 10 also includes a friction applying assembly 44 which acts to exert a lengthwise frictional force on the boards 14a to 14i when they are being lengthwisely displaced by the fence 34. The friction applying assembly 44 helps control the lengthwise displacement of the boards.

The system 10 can advantageously be used in an optimizing process. In such a process, each board is scanned and analyzed to identify the location of imperfections (not shown). Then, a trimming solution is calculated. The trimming solution is based on the scanning data analysis, and specifies at which one or two transversal positions the board should be trimmed to obtain a board of the highest value. One or more trimming saws (not shown) are positioned after the fence in the conveyance path of the boards, at known transversal positions. The fence 34 can thus be used to displace each board lengthwisely into alignment with the respective fixed-positioned saws for one end or both ends of the board to be trimmed in accordance with the trimming solution.

The action of the fence 34 on a board 14 is schematized in a simplified manner in FIG. 2A. The conveyor (not shown) exerts a longitudinal conveyance force 46 on the board 14. The longitudinal conveyance force 46 acts to convey the board 14 along the conveyance path 16. The fence 34 is positioned at a fixed position in the conveyance path 16, in interference with the laterally-extending end 30 of the board 14. The plane of the fence 48 is oriented in a converging angle α relative to the conveyor, or conveyance path 16. In FIG. 2A, the converging angle α is exaggerated to ease illustration and comprehension. Typically, before coming into contact with the fence 34, all the boards 14 have their laterally extending end 30 aligned at a common datum transversal position 50, and the fence 34 is positioned for the first gate 36a to slightly exceed that datum, outwardly of the conveyance path 16.

The longitudinal conveyance force 46 exerted by the conveyor brings the board 14 into contact with the fence 34. The fence 34 is fixedly positioned, and therefore resists the longitudinal conveyance force 46 of the conveyor by exerting a fence friction force 52 parallel to the fence 34, and a positioning force 54, normal to the fence 34, both of which forces 52, 54 are reactive to the longitudinal conveyance force 46. At the moment of contact, the positioning force 54 rapidly accelerates the board 14 into a lengthwise movement. At this moment, the lengthwise friction force 56 which can be exerted by the friction applying assembly (44—FIG. 1) can help smoothen the impact. As the board 14 is slid against the first gates 36a, 36b, 36c of the fence 34, its overall movement 58 is in the direction of the converging angle α of the fence plane 48, and includes both a longitudinal component 60 and a lengthwise (transversal) component 62, as schematized in FIG. 2B.

The scanning data of the board 14 can be used to determine the contact point 64 at which the board 14 will come into contact with the fence 34. Typically, the lug chains 22, 24 of the conveyor 12 (FIG. 1) are meshed with gears, and it is possible to know the longitudinal position of each lug pair, and thus the longitudinal position of the contact point 64, with a relatively high degree of precision. This can be achieved by using an optical encoder on the gears, for example. Using this information, a controller (not shown) of the actuators 40 (FIG. 1), can determine with a relatively high degree of precision at which moment the action of the fence 34 on the board 14 will have produced the desired lengthwise displacement for the board 14 to be correctly aligned with the trimming saws. At this moment, the controller commands the actuator of the gate 36c which is in contact with the board to move the gate to the recessed position (42—FIG. 1). While the longitudinal movement component 60 of the board is driven by the conveyor and does not change, the lengthwise movement component decelerates and comes to a halt, because the fence 34 no longer acts on the board 14. As the board 14 is continued to be carried longitudinally by the conveyor, the controller commands all the subsequent gates 36d to 36g to the recessed position 42, and back into the fence position 38 in cascade, to allow free passage of the board 14 which has reached the desired lengthwise position.

Due to the lengthwise inertia of the board 14, the lengthwise deceleration is not instantaneous. This can cause a certain degree of imprecision. The use of a lengthwise friction applying element which produces a lengthwise friction force 56 known with a relatively high degree of precision can help control this factor of imprecision. In one aspect, the lengthwise friction force 56 increases the rate of deceleration of the board 14, and thereby reduces the extra amount of lengthwise distance the board 14 travels after being freed from the positioning force 54 of the fence 34. In another aspect, if the extra amount of lengthwise distance traveled by the board 14 is relatively constant whatever the longitudinal position along the fence 34, the controller can be programmed to take this variable into account and to move the gate 36c into the recessed position 42 slightly before the board 14 has reached the desired transversal position, and the inertia of the board will then take the board the rest of the way while it decelerates.

Figure 2B:
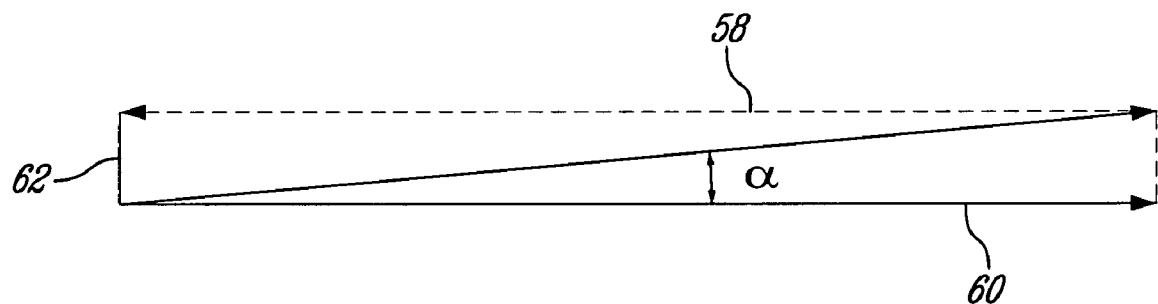
Figure 2C:
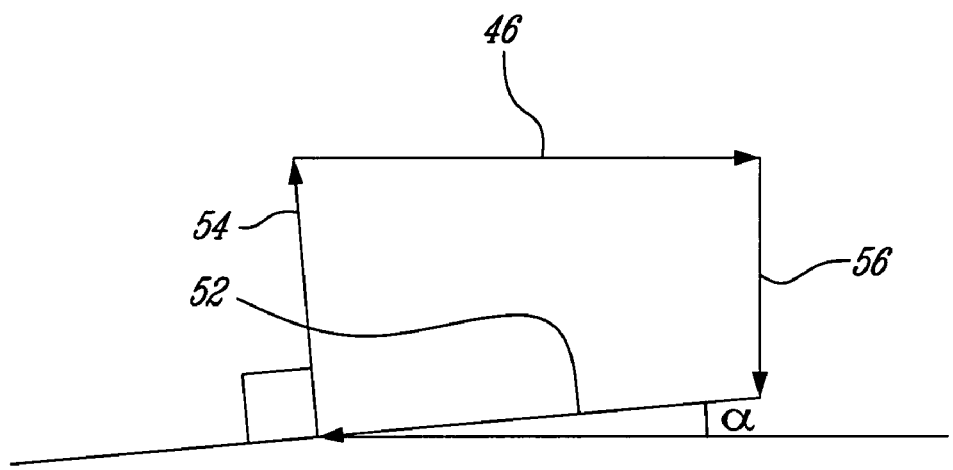

FIG. 2C shows the force diagram of the forces acting on the board in FIG. 2A while the board 14 is slid against the fence 34 at a constant speed. During the constant speed displacement, the forces 46, 52, 54, 56 acting on the board add up to zero. It will be understood that FIG. 2A is simplified, the moments acting on the board not being shown, for instance. Nevertheless, FIG. 2A can be helpful in understanding the forces at play.

FIG. 2B can helps understanding the influence of the converging angle α of the fence 34. At a given conveyor speed 60, the greater the angle α, the greater the lengthwise movement speed 62 will be, and so will the lengthwise acceleration and deceleration of the board. Therefore, reducing the angle α can help obtaining a higher degree of precision in the lengthwise displacement. However, the maximum amount of lengthwise displacement which can be achieved using the fence 34 is approximately equal to the length of the longitudinal projection of the fence 66, which is reduced when the angle α is reduced. Therefore, a fence 34 of a greater length can be required to achieve a given maximum amount of lengthwise displacement 66 with a lower angle α, for example.

Figure 3:
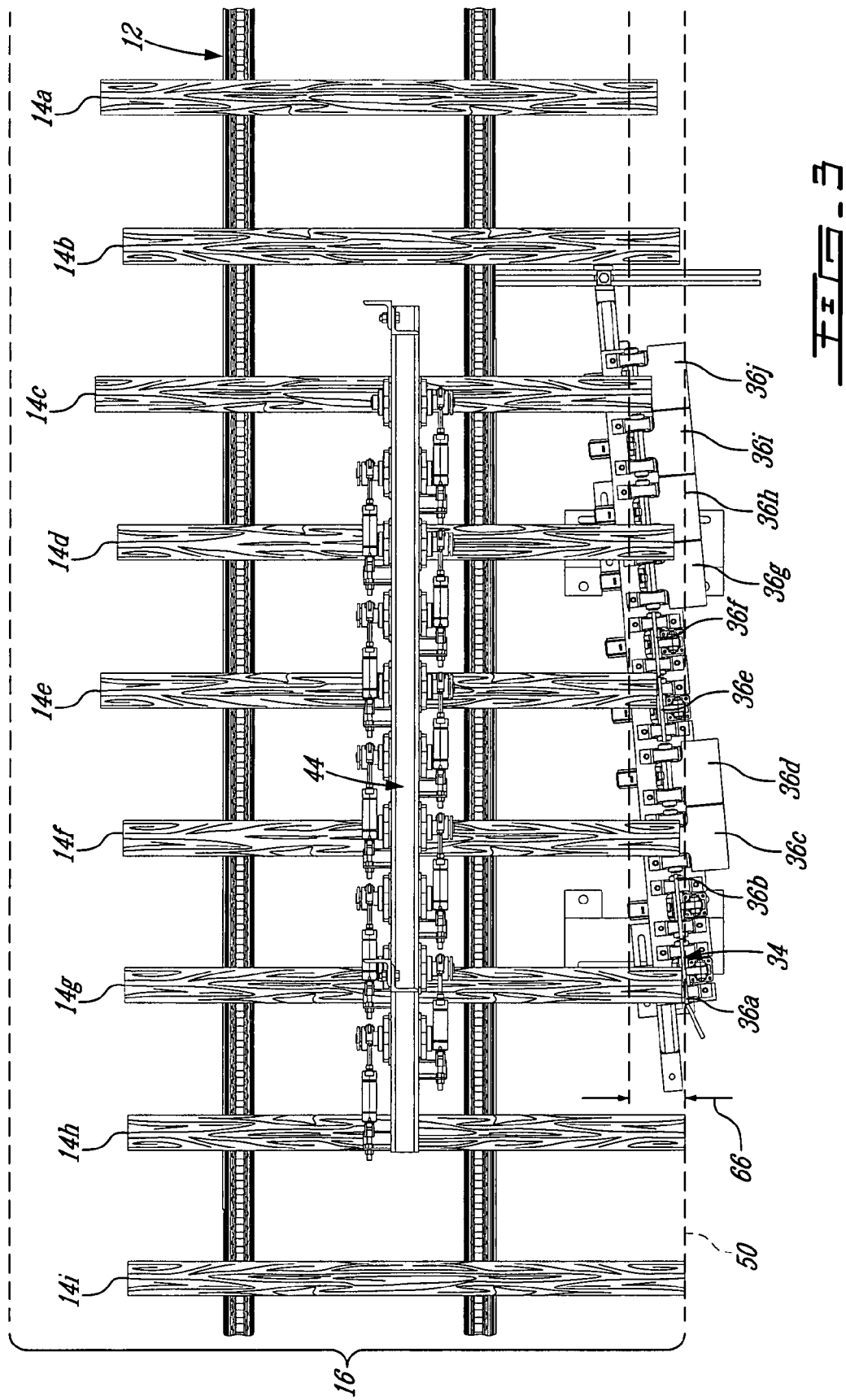
FIGS. 3, 4 and 5 are top plan views showing successive images of boards being lengthwisely displaced by the system of FIG. 1.
Figure 4:
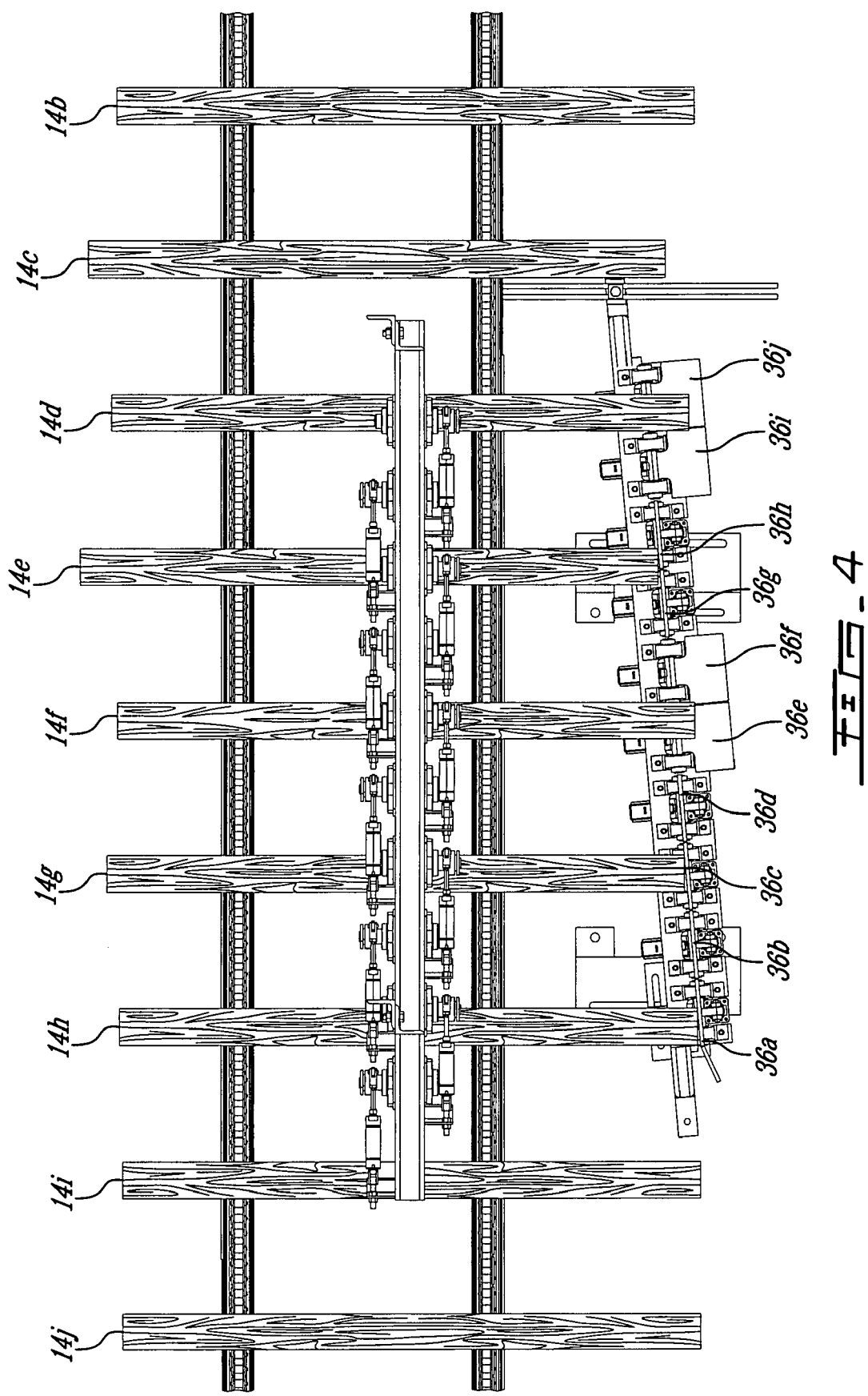
Figure 5:
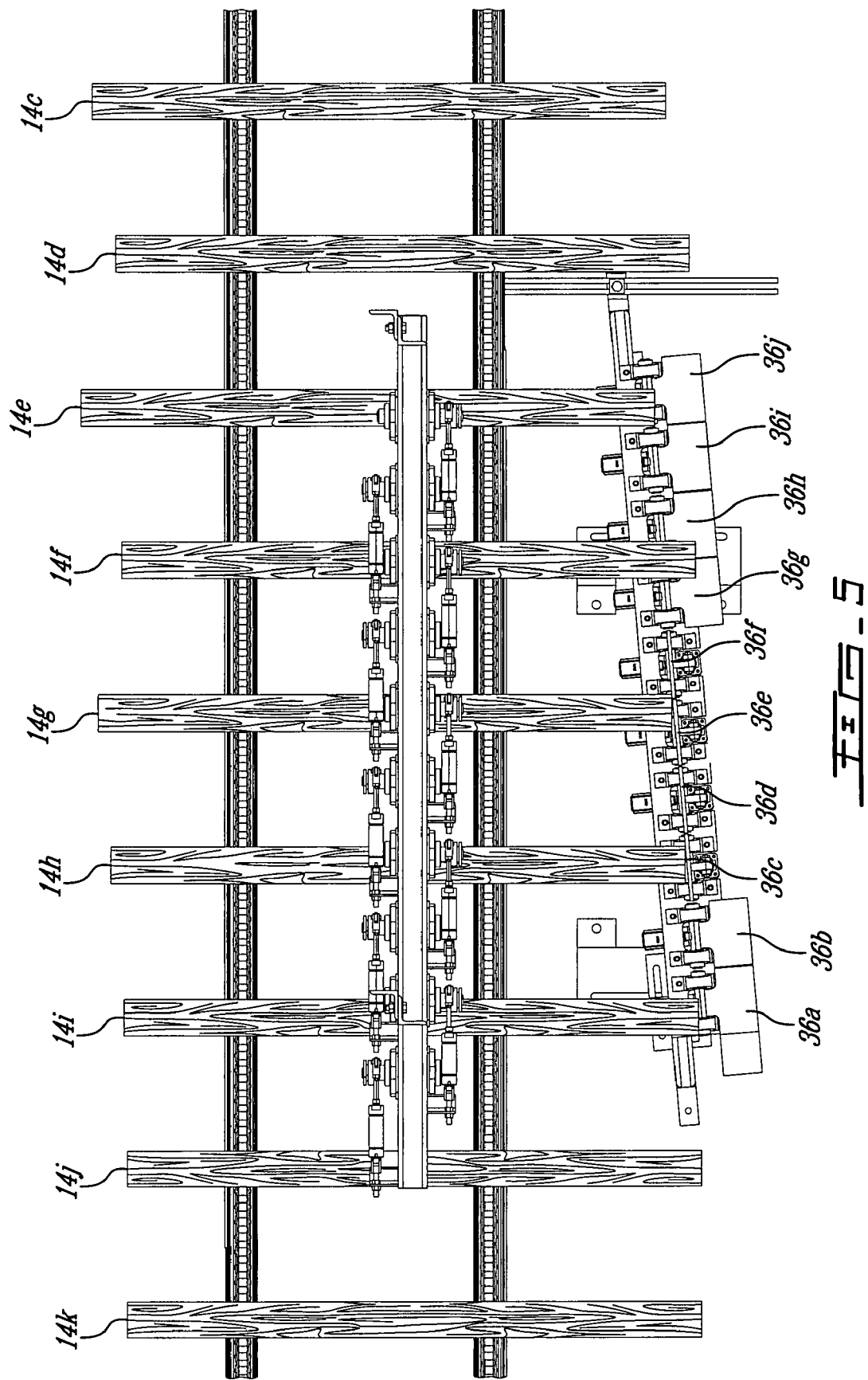

FIGS. 3 to 5 are successive views showing boards 14a to 14k being conveyed longitudinally by the conveyor 12 while they are being individually positioned lengthwisely by the fence 34. FIG. 3 shows how the boards 14h and 14i are first being carried at the datum transversal position 50 until they reach the fence 34. Board 14f has already reached its desired transversal position, and has been freed by the fence 34, the gate 36c being in the recessed position. Board 14e is being slid against the fence 34 to be taken to another transversal position. During the displacement of board 14f, the gates move into the recessed position and back into the fence position in cascade to let it pass, this is shown by referring successively to FIGS. 3 to 5. In FIG. 4, board 14f is still free from the fence 34, gates 36e and 36f being in the recessed position, and board 14e is still being slid against the respective gates 36g and 36h of the fence 34 which are in the fence position. In FIG. 5, both board 14f and board 14e are freed from the fence, both at their respective desired transversal position, while subsequent boards 14h and 14g are being slid against the fence. Little or no lengthwise displacement was required for board 14i, and even the first gate 36a is letting it pass by, by being in the recessed position.

Figure 6:
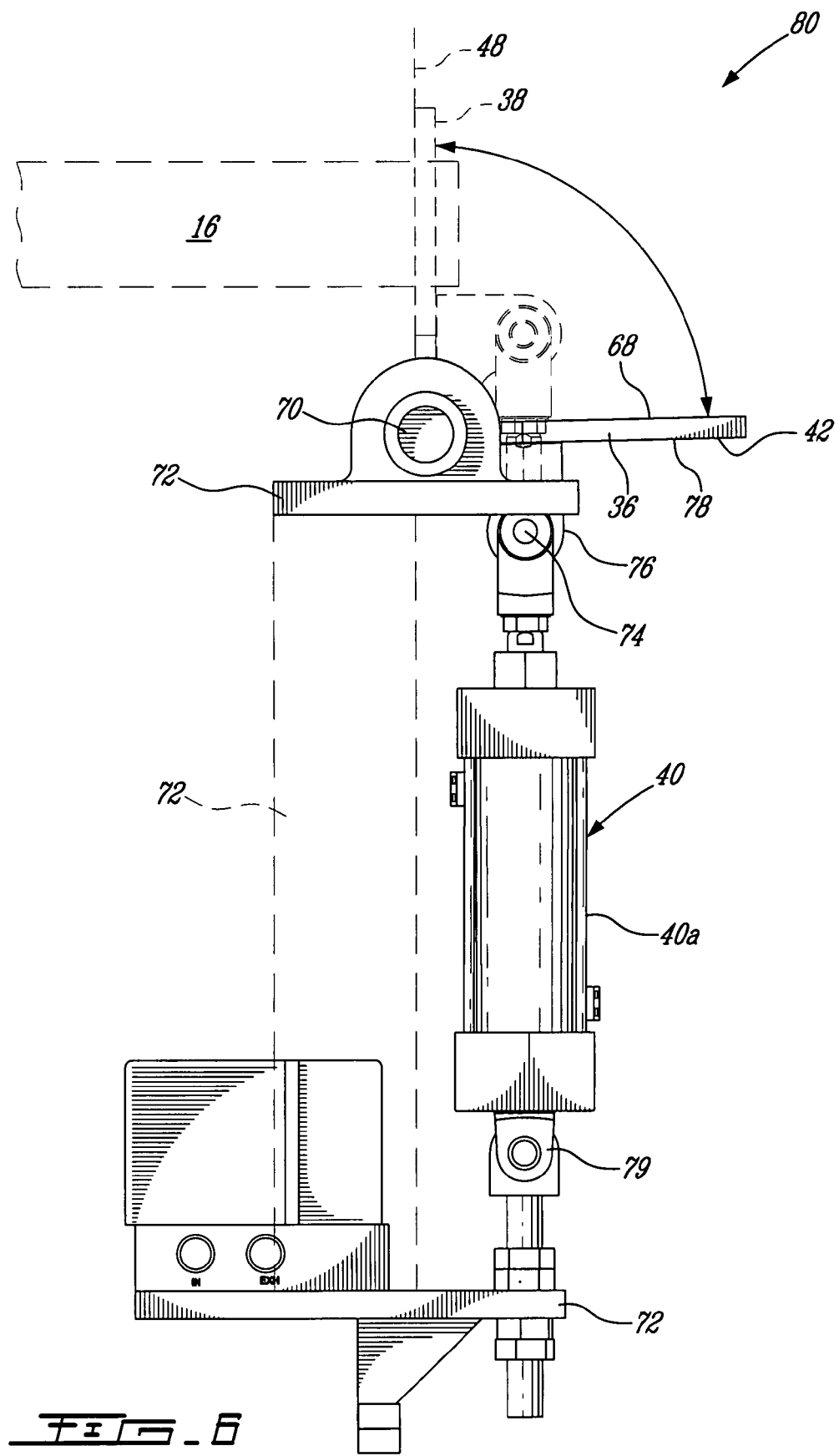
FIG. 6 is a side view of a portion of a fence assembly used in the system of FIG. 1.
Figure 7:
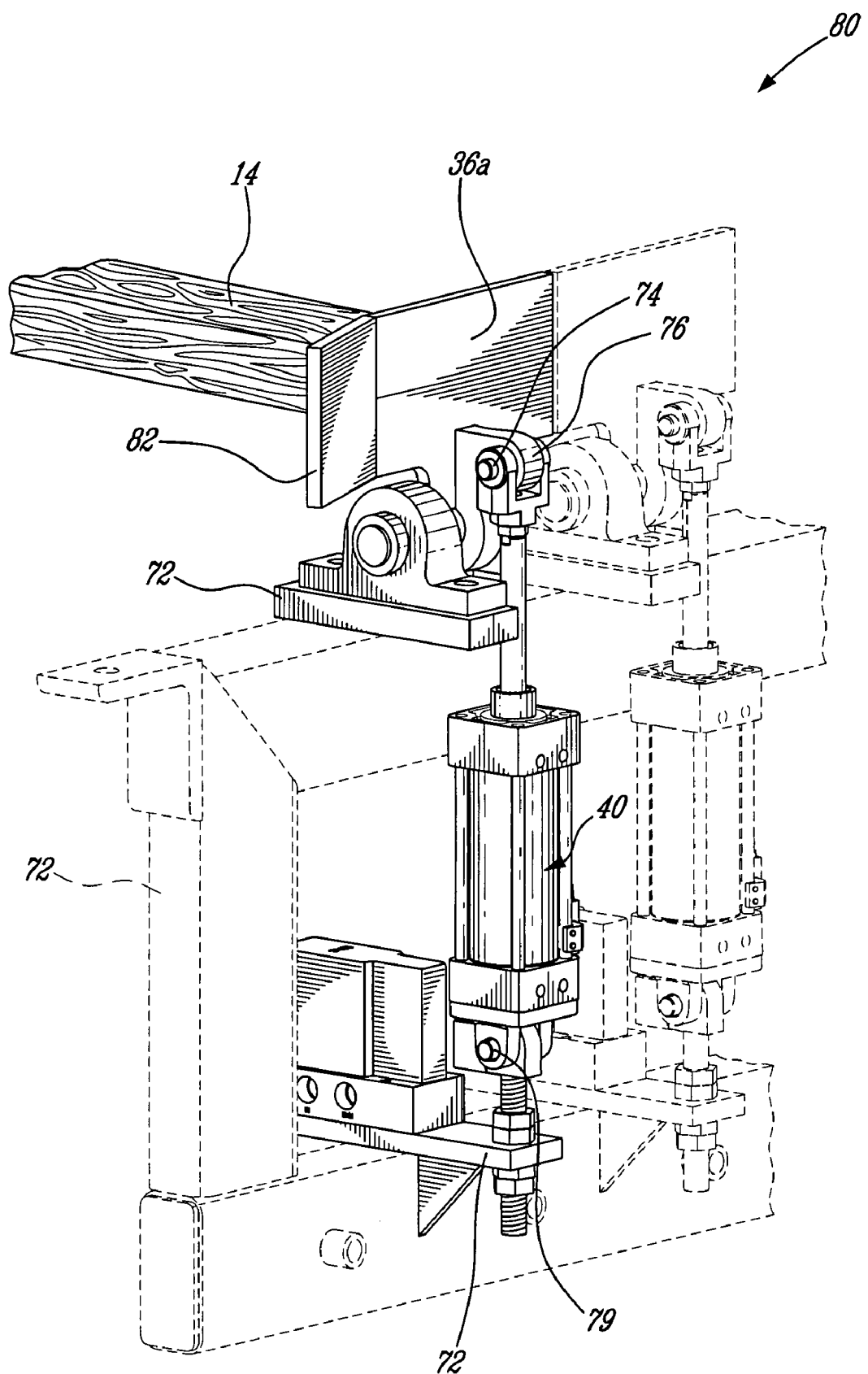
FIG. 7 is a perspective view of the portion shown in FIG. 5.

FIGS. 6 and 7 show a gate 36 of the fence 34 in greater detail. All the other gates are similar in design. The gate 36 has a planar surface 68 adapted to slidingly receive the boards, when the gate 36 is in the fence position 38, the planar surface 68 is positioned in the fence plane 48 where it is in interference with the conveyance path 16 of the boards. The gate 36 is movable out from the conveyance path 16, into the recessed position 42. In this example, the gate 36 is movable between the two positions 38, 42 by pivoting around a common gate pivot axis 70. The gate pivot axis 70 is received on a common support body 72. The gate's respective actuator is extendible in this case, and is more particularly a piston-cylinder assembly 40a (hereinafter "piston 40a" for simplicity) which has one end 74 pivotally mounted to an extension 76 on the back side 78 of the gate 36, and the other end 79 pivotally mounted to the support body 72. The gate 36, support body 72, and actuator 40 are provided as parts of a fence assembly 80. Of course, the support body 72 can include a plurality of assembled components such as a frame and support plates for the gates, as it is shown in the FIGS. 6 and 7. In alternate embodiments, the gates can be movable by translation instead of by pivoting, for example. Pivoting was selected in this example because it allowed to obtain a faster rate of movement out of the conveyance path for a given displacement of the piston shaft as compared to translation, by a judicious positioning of the extension on the gate. Pneumatic pistons were used in the example, but other pistons such as electrical pistons can alternately be used.

In FIG. 7 the first gate 36a has a deflector 82. The deflector 82 can serve to reposition a board 14 in the event where it accidentally exceeds the datum (see FIG. 2A).

The width of the gates can be adapted in view of specific applications. If the gates are specifically designed for use with larger boards, they can typically be made wider than if they are designed for use with thinner boards. Therefore, having more gates per fence length gives more flexibility. However, it also typically results in being more expensive, because of the extra actuators which are associated therewith. The gates are made thinner than the transversal projection of the spacing between the boards on the fence, so that they can be raised between two subsequent boards without contacting either one. In the illustrated embodiment, the gates all have the same width for simplicity, but can alternately be provided of different widths.

Figure 8:
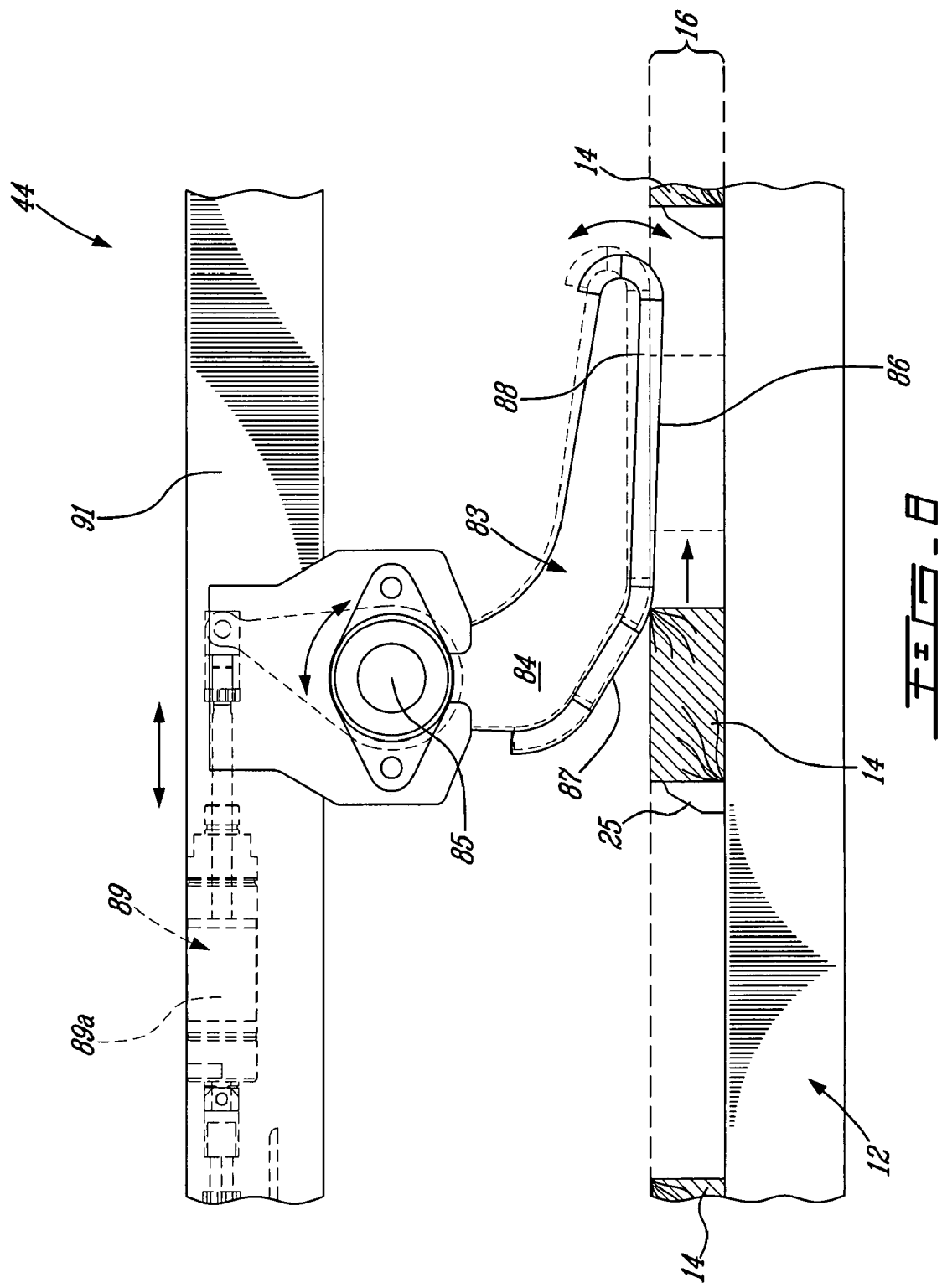
FIG. 8 is a side view of a portion of a lengthwise-friction-applying assembly used in the system of FIG. 1.

FIG. 8 shows one friction-applying skate 83 which forms part of the friction-applying assembly shown in FIG. 1. The friction-applying skate 83 includes a skate body 84 which is pivotally mounted to a skate pivot shaft 85. The lower edge 86 and upstream edge 87 of the skate body 84 are covered by a friction-exerting material 88, such as rubber for instance. A skate actuator 89, or more particularly a piston 89a in this example, acts on the skate pivot shaft 85 and pivotally biases the skate body 84 into the conveyance path 16 of the boards 14. The upstream edge 87 of the skate body 84 is slanted, and the pivotally biasing force is adjusted, such that the friction skate 83 pivotally yields to the board 14 as the board 14 is pushed thereunder by the lugs 25 of the conveyor 12, but maintains a compressive force against the board 14 in opposition to the conveyor 12 while the board 14 is slid thereunder. In this example, the maximal pivoting of the skate 83 is determined by the maximal extension of the piston 89a.

Figure 9:
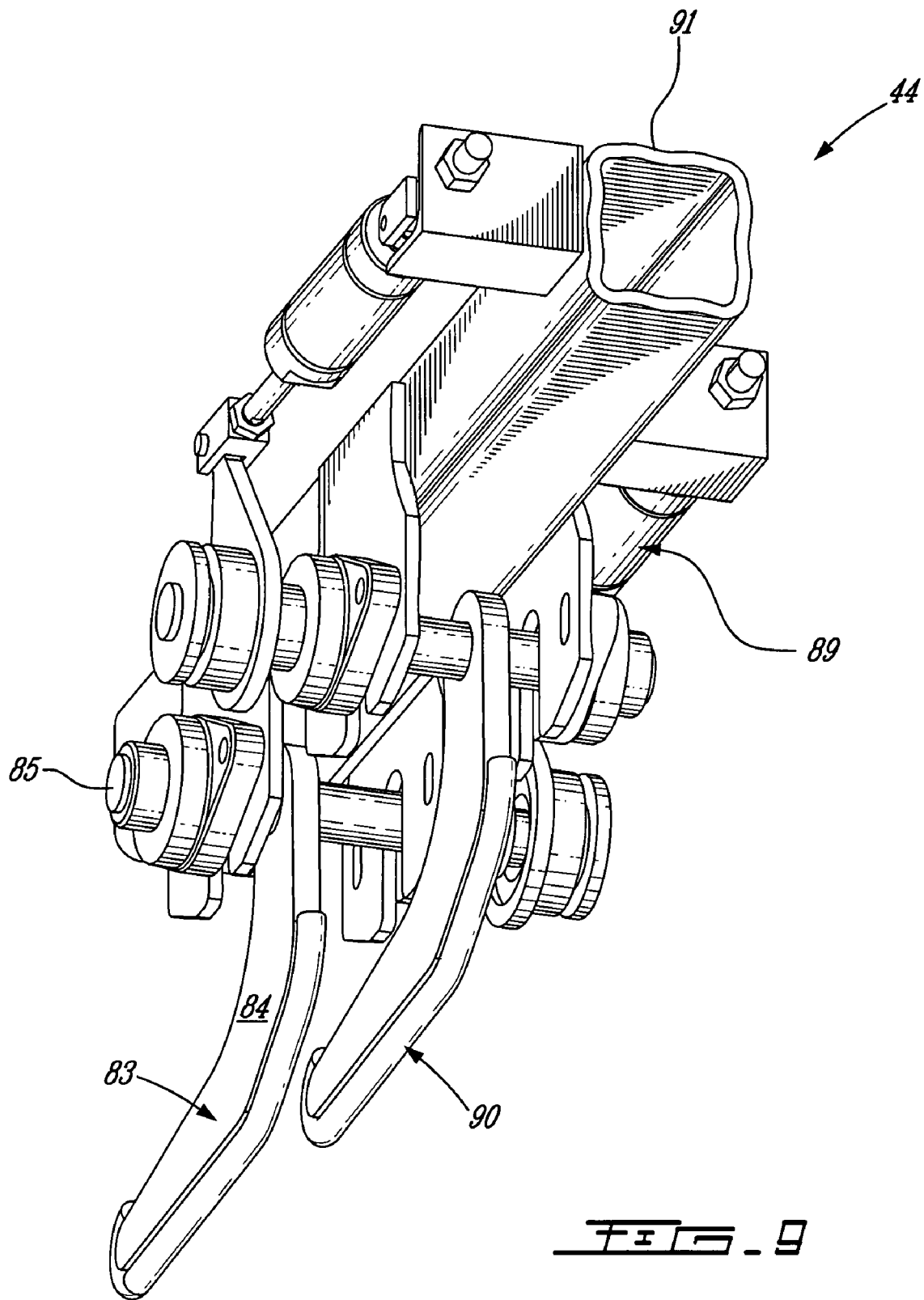
FIG. 9 is a perspective view a portion of the friction applying assembly used in the system of FIG. 1.

As shown in FIG. 9, the skates 83, 90 are positioned in pairs in succession on the common skate base 91, in a manner that there is always a skate in contact with a board which is being slidingly conveyed against the fence.

Turning back to FIG. 1, it will be understood that the friction applying assembly 44 and the fence assembly 80 are positioned at fixed positions relative to one another, and relative to the guide rails 26, 28 of the conveyor 12. In this example, the converging angle of the fence 34 relative to the conveyor 12 can be modified by sliding the fence assembly 80 along guides 92, 93, 94, and securing the fence assembly 80 into a fixed position on the guides 92, 93, 94.

It will be understood that the fence assembly can be sold as a stand-alone component intended for mounting adjacent a previously existing conveyor. The fence assembly can also be sold in combination with a friction applying assembly, for example.

The illustrated embodiment is provided only as an example. Alternate embodiments are possible and can depart from that which has been illustrated.

For instance, the system or method can be used with boards of various dimensions. Also, the boards can be of a different material than wood. Further, the subsequent boards carried along the conveyor can have different lengths, and can even have different widths and thicknesses, instead of all being of substantially similar major dimensions. Even further, the method or system can be used with other elongated articles than boards, in any suitable alternate application.

Also, the conveyor can be any suitable conveyor in view of the given application. Typically, the conveyor will include pushing elements which exert a longitudinal pushing force on the elongated articles. The pushing elements can be longitudinally interspaced regularly or irregularly. In the example illustrated in the attached figures, each pushing element was provided as a pair of lugs, each one of the two lugs of the pair being associated with a respective lug chain, and the pairs of lugs are regularly interspaced. An alternate pushing element can consist of a transversally elongated flange extending normally from a conveyor belt, for example.

The surface of the gates which is intended to slidingly receive the boards have a low friction coefficient, to ease the sliding action. The gates can be made of stainless steel, or another similar material, to that effect. Stoppers can be used with the gates to limit the maximum extent of movement of the gates. Alternately, the maximum extension of a piston in a cylinder can serve to limit the maximum extent of movement. In alternate embodiments, the gates can move by sliding along guides instead of by pivoting, for example.

A lengthwise friction element can be used to limit or control the lengthwise freedom of movement of the boards. In the illustrated example, the lengthwise friction element is provided as a plurality of friction applying skates which subsequently come into frictional contact with the board, in opposition with the conveyor. Alternately, the lengthwise friction element can take the form of a component provided as part of the conveyor immediately upstream of the respective pushing element, and on which the elongated article rests as it is pushed by the pushing element. Such a component can be made of rubber or another material which has a relatively high friction coefficient. A lengthwise friction element which is part of the conveyor will typically provide less friction than a lengthwise friction element which acts in compression on the board, in opposition to the conveyor, but may nevertheless provide a satisfactory degree of friction for certain applications.

It will be understood that the examples described above and illustrated are exemplary only. The scope is indicated by the appended claims.

What is claimed is:

1. A board positioning system, the system comprising:
a conveyor having a plurality of longitudinally interspaced pushing elements, each pushing element being configured and adapted to receive a transversally-oriented board, and to exert a longitudinal conveyance force on the received board to convey the board along a conveyance path, with an end of the board extending laterally from the conveyor, when the conveyor is in operation; and
a fence, adjacent the conveyor, positioned in the conveyance path, in interference with the laterally-extending end of the board, and defining a converging angle with the conveyor, the fence being configured and adapted to exert a positioning force, reactive of the conveyance force, to move the board lengthwisely as the laterally-extending end of the board is being slidingly conveyed against the fence when the conveyor is in operation, the fence having a plurality of adjacent gates, each gate being individually movable out of the conveyance path, when the positioning force has imparted a given lengthwise displacement to the board, and movable back into a fence position after the board has passed by the respective gate.

2. The system of claim 1 further comprising a lengthwise frictional element configured and adapted to exert a lengthwise frictional force reactive of the positioning force, and operative to arrest the lengthwise movement of the board when the positioning force ceases.

3. The system of claim 2 wherein the lengthwise frictional element is distinct from the conveyor, and applies a pressure to the board in opposition to the conveyor.

4. The system of claim 3 wherein the lengthwise frictional element includes a plurality of successive skates, each skate being pivotally mounted to a common skate base and being pivotally biased toward the conveyance path of the board, and being configured and adapted to yield to the board when the board is pushed against the skate by the conveyance force.

5. The system of claim 1 wherein the gates are movable out of the conveyance path and back into the fence position in cascade, to allow free passage of a board which has reached a given lengthwise displacement, and to displace a subsequent board to a greater lengthwise displacement, respectively.

6. The system of claim 1 wherein the gates are pivotally mounted to the support body and are pivotable between the respective fence positions and the respective recessed positions.

7. The system of claim 1 wherein the given lengthwise displacement is predetermined.

8. The system of claim 7 wherein the given lengthwise displacement is predetermined by using a trimming solution for the board, and a known transversal position of at least one trimming saw in the conveyance path.

9. The system of claim 1 wherein the conveyor is a lug-chain conveyor having two lug chains, each lug chain traveling along a respective lug chain guide, and each pushing element has two lugs, each one of the two lugs being associated with a respective one of the two lug chains.

10. The system of claim 1 wherein the pushing elements are equally spaced longitudinally along the conveyor.

11. The system of claim 10 wherein the gates have a longitudinal length which is smaller than the spacing between two adjacent wood boards.

12. A method of positioning a transversally-oriented board being conveyed in a longitudinal direction, the method comprising:
obtaining a desired transversal position for the board;
sliding a laterally extending end of the board against a fence having a plurality of adjacent gates positioned in a common plane, the common plane defining a converging angle relative to the longitudinal direction, the fence thereby imparting a lengthwise displacement to the board;
converting the desired transversal position to a longitudinal position of the board relative to the fence;
during the sliding, determining when the board reaches the longitudinal position;
upon said determining, moving the one of the gates which is in contact with the board out from longitudinal interference with the board;
after said moving the one of the gates, moving any subsequent gate or gates of the fence out from interference with the board; and
replacing the one of the gates, and the any subsequent gate or gates back into the common plane once the board has passed by each respective gate.

13. The method of claim 12 wherein the moving and the replacing is done in cascade for successive gates.

14. The method of claim 12 wherein the converting includes using the converging angle.

15. The method of claim 12 wherein the determining includes using longitudinal board position data from a conveyor which conveys the board.

16. The method of claim 15 wherein the determining further includes using scanning data of the board to determine the contact point of the board with the fence.

17. The method of claim 12 wherein the obtaining includes calculating the desired transversal position using a trimming solution and data on the fixed transversal position of at least one trimming saw positioned after the fence in the conveyance path.

18. The method of claim 12 wherein the obtaining includes using a desired transversal displacement.

19. The method of claim 12 further comprising exerting a lengthwise frictional force on the board after said moving the one of the gates, to halt the lengthwise movement of the board.

20. The method of claim 19 wherein the exerting includes exerting a compressive force on the board.

21. The method of claim 12 wherein the obtaining includes subtracting an inertia displacement value from an actual desired transversal position value to obtain the desired transversal position.

22. A fence assembly for use in a longitudinal elongated article conveyance path of a lug conveyor, to individually displace transversally-oriented and longitudinally-interspaced elongated articles lengthwisely as the elongated articles are being carried by the lug conveyor, the fence assembly comprising: a support body; a plurality of adjacent gates, each gate being movable between a respective fence position and a respective recessed position, the fence positions being immediately adjacent in a common fence plane, and fixedly positioned relative to the support body; a plurality of actuators, each actuator connected between the support body and a respective one of the adjacent gates to actuate the movement of the respective gate; the fence assembly being fixedly positionable relative to the lug conveyor with the fence positions in the elongated article conveyance path, the recessed positions out of the elongated article conveyance path, and the fence plane defining a converging angle relative to the lug conveyor.

23. The fence assembly of claim 22 further comprising a controller configured and adapted to obtain a determination that a given elongated article has reached a given lengthwise displacement imparted by the fence assembly, and to control the respective one or more actuators of:
  one of the gates being in contact with the given elongated article when the determination is obtained; and
  any subsequent gate or gates in the elongated article conveyance path;
  to move the respective one or more gates into the respective one or more recessed positions to allow free passage of the given elongated article, and back into the respective one or more fence positions after the given elongated article has been carried passed each respective gate by the lug conveyor.

24. The fence assembly of claim 22 wherein the gates are pivotally mounted to the support body and the planar surfaces are pivotable between the respective fence positions and the respective recessed positions.

25. The fence assembly of claim 22 wherein the elongated articles are regularly longitudinally interspaced, and the gates are longitudinally smaller than the transversal projection of each regular spacing along the fence plane.

* * * * *